Figure 1:
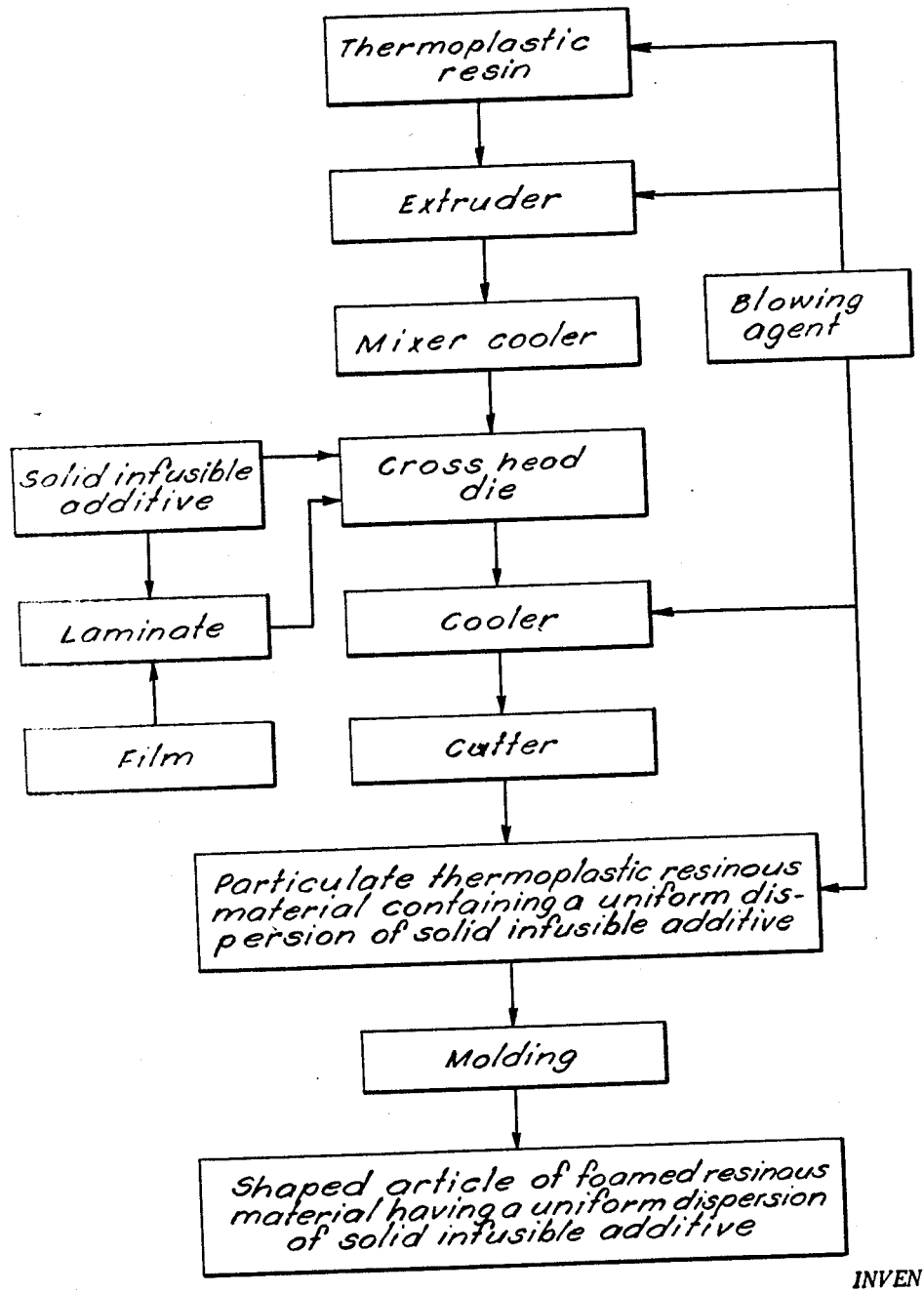

INVENTOR.
Stephen V. T. Marshall
BY
Robert B. Ingraham
AGENT

United States Patent Office 3,243,483
Patented Mar. 29, 1966

3,243,483
METHOD AND APPARATUS FOR INCORPORATING SOLID BODIES INTO THERMOPLASTIC COMPOSITIONS
Stephen V. T. Marshall, Midland, Mich., assignor to The Dow Chemical Company, Midland, Mich., a corporation of Delaware
Filed June 16, 1961, Ser. No. 117,591
14 Claims. (Cl. 264—45)

This invention relates to a method and apparatus for the incorporation of solid bodies into thermoplastic compositions. It more particularly relates to the incorporation of filamentary and flat plate-like materials uniformly within a body of thermoplastic material.

The admixture of solid materials with thermoplastic resins for most practical purposes is readily accomplished by mechanical milling, dry blending, and the like techniques. Much difficulty is frequently encountered if the material to be admixed with thermoplastic material is larger than dusts or finely divided particulate masses such as material which will pass through a 100 mesh screen U.S. sieve size. If the density of the solid particulate material to be mixed with the thermoplastic resinous composition is significantly different than that of the thermoplastic resinous composition, stratification tends to occur if the materials are dry blended. By the term dry blending is meant the simple admixture of two particulate masses by such means as ribbon blenders, tumblers, and the like. Particularly vexatious is the problem of blending metal particles such as aluminum slivers with resins such as polystyrene for the preparation of lenses frequently employed in very high frequency and ultra high frequency antenna systems for the propagation of radio signals. Such lenses are described in United States Patents 2,716,190 and 2,943,358. Generally these lenses are comprised of expanded thermoplastic resinous material having a relatively low dielectric loss factor and a particulate metal, advantageously aluminum, incorporated in an expanded resin matrix as small, discrete particles of rather definite dimension and configuration for optimum performance. For satisfactory performance of such lens system, the dielectric constant of the foam materials must be held within rigid limits if optimum beam, width, and pattern are to be achieved. At the present time, generally the dielectric constant uniformity of such compositions obtained in commercial production is about 80 percent, that is, the variation in dielectric constant throughout a block or body prepared from a thermoplastic expandable material having metal slivers or particles dispersed therein will vary by a factor of plus or minus 10 percent from the average dielectric constant of the block. A uniformity of 80 percent, although operative for some purposes, is considerably less than is desirable for antenna systems having high resolution, narrow beam width and closely controlled radiation patterns.

It would be advantageous if there were available a method for the preparation of expandable thermoplastic resinous compositions having uniformly incorporated therein a particulate additive.

It would be further advantageous if such a method would permit the incorporation of metallic particles into a thermoplastic resinous composition in such a manner that a high degree of uniformity of dispersion is obtained.

Additionally, it would be beneficial if there were available an apparatus which would permit the incorporation of particulate material into an expandable thermoplastic resinous composition whereby such particulate material could be included without significantly altering its physical shape.

It would be very desirable if such apparatus and method would permit the incorporation of thin aluminum strips or slivers into an expandable thermoplastic polystyrene composition and result in a high degree of uniformity.

These benefits and other advantages may be attained by the practice of the method of the invention which comprises preparing a heat plastified, extrudable mass of thermoplastic resinous composition, continuously forwarding and dividing said mass into at least two generally opposed portions, adding between said portions an additive material, converging said generally opposed portions to intimately contact said additive to form a laminate and subsequently dividing the resultant laminate into a particulate mass.

Also contemplated within the scope of the invention is an apparatus comprising: an extruder for the forwarding of extrudable thermoplastic material having in cooperative association therewith a die, said die comprising a housing defining at least a pair of generally opposed passageways, said passageways adapted to receive extrudable thermoplastic mass from said extruder, said housing defining an additive passageway disposed between said converging opposed passageways and in full communication therewith.

Figure 2:
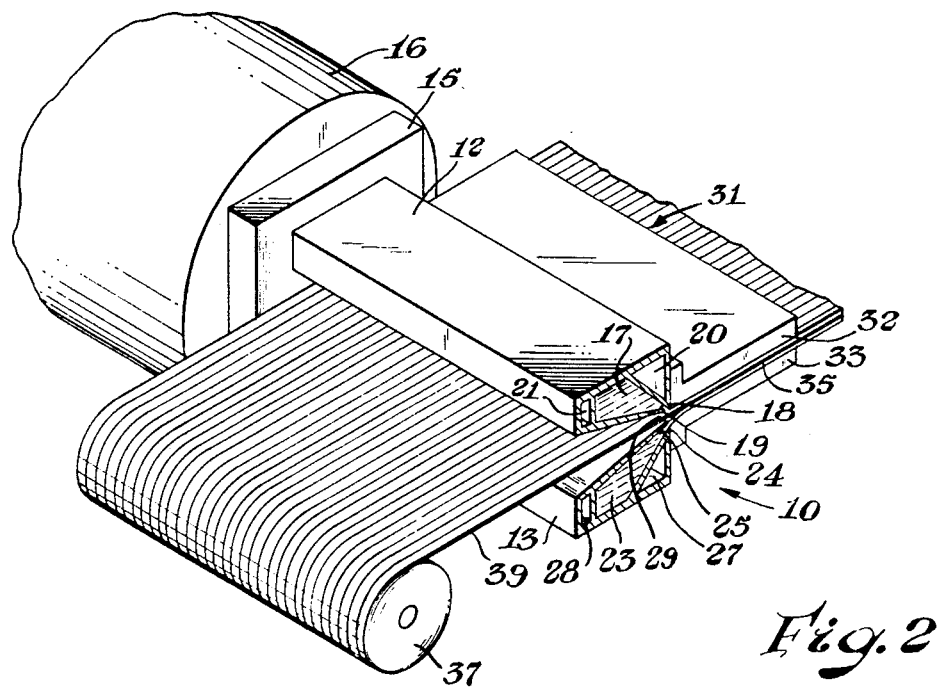
Figure 3:
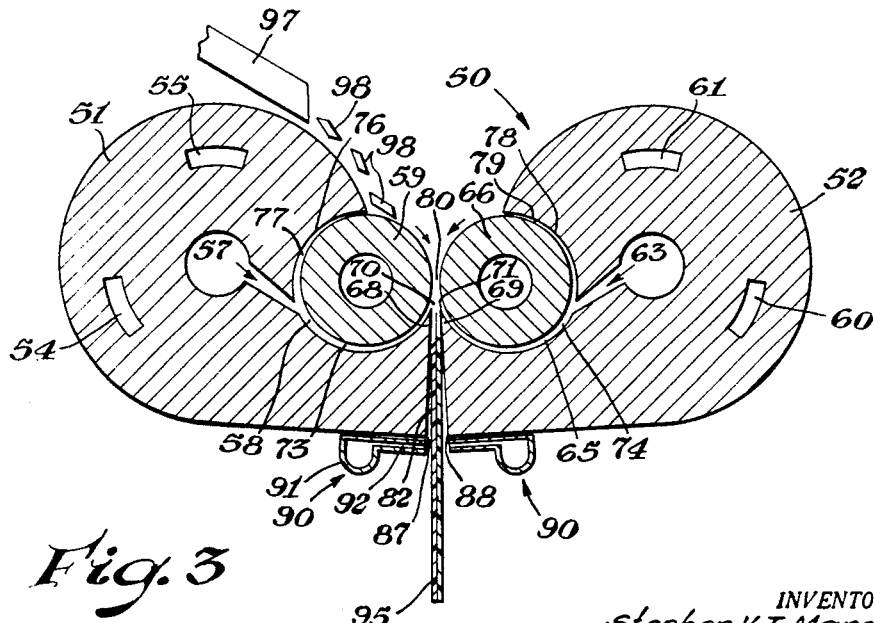

Other benefits and advantages of the present invention will become more apparent when taken in consideration with the following specification and drawing wherein:

FIGURE 1 is a flow diagram of the process of the invention.
FIGURE 2 is a schematic isometric partly-in-section view of a cross head die in accordance with the invention.
FIGURE 3 is a schematic sectional view of an alternate form of die in accordance with the invention.

In FIGURE 1, various routes are shown by which a solid infusible plate-like additive may be uniformly dispersed in an expandable thermoplastic resinous material. The thermoplastic resinous material, preferably in particulate form, is fed to an extruder wherein there is incorporated in the heat plastified mass a volatile material which acts as a blowing agent. Basic operations for preparing a foamable extruded thermoplastic mass are described in United States Letters Patents 2,669,751 and 2,857,625. Advantageously, following the extruder is a mixer cooler which serves to more thoroughly disperse the blowing agent within the heat plastified mass and attain a uniform temperature through the mass prior to feeding to a cross head die and incorporating the solid infusible additive such as aluminum foil in sheet, strip, ribbon or planchette form. From the cross head die the thermoplastic material, including the solid infusible additive, is cooled and subsequently passed to a cutter where the extrude from the die is divided into a particulate mass. The particulate mass containing a blowing agent is then subjected to heat sufficient to cause the particulate mass to expand and knit together into a solid shaped article of foamed resinous material having uniformly dispersed therethrough a solid infusible additive.

Alternately, the blowing agent may be incorporated into the thermoplastic resin prior to feeding to the extruder, or the blowing agent may be incorporated into the extrude issuing from the cross head die or the blowing agent may be incorporated after the cooled extruded mass is divided into particles. For ease of incorporation of the solid infusible additive which optionally is available in sheet or finely divided form, the material may be laminated with a single thin plastic film preferably having a softening temperature equal to or less than that of the thermoplastic resin employed in the process and alternately the additive may be incorporated between two layers of such material and then fed to the cross head die.

In FIGURE 2 there is shown an isometric schematic partly-in-section view of a cross head die generally indicated by the reference numeral 10. The cross head die 10 comprises an upper housing 12 and a lower housing 13 maintained in fixed spaced relationship to each other by base member 15 which, in turn, is secured to a polymer supply source 16. The housing 12 defines a polymer passageway 17 terminating by an upper die lip 18 and a lower die lip 19. Within the housing 12 are disposed heat exchange passageways 20 and 21. Similarly, housing 13 is provided with polymer passageway 23 terminating in lower die lip 24 and upper die lip 25 and having positioned and defined therein heat exchange passageways 27 and 28. A slit-like passageway 29 is defined by lower die lip 19 and upper die lip 25 of housing 12. Affixed to the upper die lip 18 and lower die lip 24 is a cooling section generally indicated by the reference numeral 31. The cooler 31 comprises an upper heat exchange member 32 and a lower heat exchange member 33 spaced apart to define the generally plate-like channel 35. A supply roll 37 provides a sheet 39 of infusible plate-like material which is fed into a slot 29 between the upper and lower die housings 12 and 13. Channels 17 and 23 are in full communication with the passageway 35 as is the slot 29.

FIGURE 3 illustrates a schematic cross sectional view of an alternate embodiment of a die head generally designated by the reference numeral 50. The die head 50 comprises a housing portion 51 and a housing portion 52 of opposite hand. Disposed within the die housing 51 are heat exchange channels 54 and 55, and polymer supply channel 57 in full communication throughout its entire length with a generally cylindrical cavity 58. Disposed within cavity 58 is a roll 59. The die housing 52 has disposed therein heat exchange passages 60 and 61 and a polymer supply passageway 63 in full communication with a generally cylindrical cavity 65 having disposed therein a roll 66. The generally cylindrical cavities 58 and 65 terminate in lip members 68 and 69 respectively, which depart from a true cylindrical configuration. Narrow throat portions 70 and 71 are formed between the roll 59 and the lip member 68 and the roll 66 and lip member 69. Between the roll 59 and the wall of the cavity 58 there is a polymer passage 73. Between the roll 66 and the wall of the cavity 65 there is a polymer passage 74. A generally cylindrical concave surface 76 of the housing 51 is disposed closer to the roll 59 than is the generally cylindrical surface of cavity 58 defining a space 77. A similar narrow space 78 is defined by the generally cylindrical surface 79 of housing 52. The rolls 59 and 66 are disposed in such a manner that the minimum clearance 80 between their surfaces is about equal to the sum of the clearances in space 77 and space 78. The adjacent portions of the die halves 51 and 52 define extrusion passageway 82 which is terminated adjacent the rolls 59 and 66 by the inner lips 68 and 69 which form a restriction in the passageways 58 and 65. At the opposite end of passageway 82 are lips 87 and 88 which are the terminal portions of the housing halves 51 and 52 respectively. Adjacent to the lip 87 is a cooling assembly 90 comprising a conduit 91 and a discharge slot 92 directed toward the extrudate 95. A like cooling assembly 90 is positioned adjacent lip 88. Portioned above the rolls 59 and 66 is additive supply means 97 discharging infusible platelets or planchettes 98 onto the roll 59.

In operation of the embodiment of FIGURE 2 a thermoplastic resinous material is expressed from an extruder or polymer supply 16 into the channels 17 and 23 of the die housings 12 and 13. Suitable extrusion temperature is maintained by a circulating liquid of the appropriate temperature in the heat exchange passages 20, 21, 27 and 28. The thermoplastic resinous material, on filling the passageway 17, is forced out in a thin sheet between the lips 18 and 19 and similarly from the passageway 23 between the lips 24 and 25.

Thus two flat sheets of thermoplastic material are brought together in the cooler assembly 31 while still at a sufficient temperature to bond firmly together. The solid additive material such as, for example, aluminum foil is fed as a sheet or plurality of closely adjacent strips 39 from the supply roll 37. These enter the passage 19 and contact the extruded sheets issuing from the die halves 12 and 13. The extruded sheets are relatively viscous when issuing from the die lips and the adhesion of the freshly extruded polymer sheet to the infusible material draws the infusible material into the center of the two extruded parts. Thus, the product issuing from the cooler comprises a laminated structure having exterior layers of extruded thermoplastic material having incorporated therebetween the additive sheet 39. Subsequently, when cooled to a lower temperature, the composite sheet becomes solid and is subsequently fed to a comminuting apparatus and is broken into a plurality of small particles. The product of the comminuting apparatus is a particulate mass having a uniform distribution of the infusible additive material therein.

Operation of the embodiment of the invention illustrated in FIGURE 3 is substantially similar to that of the embodiment of FIGURE 2. However, the apparatus of FIGURE 3 is adapted to incorporate the infusible plate or sheet-like material into the thermoplastic resin at a less viscous stage than is the embodiment of FIGURE 2. The rolls 59 and 66 in cooperation with the housing halves 51 and 52 form a viscous drag pump wherein a minor portion of the material supplied to channels 57 and 63 is carried between surfaces of the rolls 59 and 66 into the mass 80 between the rolls. The major portion of polymer flow is from the passageways 57 and 63 through the spaces 58 and 65 and out through passage 82. The operation of the rolls 59 and 66 as a viscous drag pump tends to oppose this flow, but because of the large clearance in the passages 58 and 65, insufficient back pressure is presented to disturb extrusion. The rolls 59 and 66 advantageously are heated by cartridge heaters (not shown) or similar means to a temperature substantially above that of the polymeric material being supplied to the die halves 51 and 52. Thus, the rolls rotate relatively freely and with less forwarding action than would normally be assumed. The restrictions or throat portions 70 and 71 formed adjacent the rolls and inlet and passageway 82 form areas of relatively high velocity flow in the polymer streams in passageways 58 and 65. These polymer streams tend to oppose the flow induced by the rotation of the rolls 59 and 66 and strip the material adjacent to these rolls from them and force it into the passageway 82. Thus, if a continuous web or planchettes of infusible material are introduced to the die assembly 50 and distributed evenly over the surface of one or both of the rolls 59 and 66, the infusible material is evenly distributed and generally centrally positioned within the extrude 95 issuing from the passageway 82. The infusible material is readily fed to the die 50 in the form of sheet, ribbon, slivers, powders and the like. On issuing from the passage 82 the extrude is cooled by the opposed cooling assemblies 90. Thus, the infusible material is readily and uniformly incorporated into the thermoplastic extrude.

After cooling, the sheet advantageously is divided into a particulate mass of small particles. Foaming of the particulate mass prepared by a die in accordance with the invention into a unitary object results in a very uniform distortion of the infusible material through the foamed article.

In certain cases where the infusible material is difficult to bond or incorporate within the thermoplastic material, it is handled initially as a web and laminated to a thermoplastic film prepared from a resin which is compatible or even identical with the material supplied by the extruder. The film may then be laminated to the infusible material to give one or more surfaces which will readily adhere to the extrude. Subsequent cooling and comminution of the extruded sheet results in a particulate mass having a substantially uniform distribution of the infusible material therein.

Advantageously, extrusion from the die in accordance with the apparatus or method of the invention may be at a temperature either above or below the foaming temperature of the plastic if the blowing agent is incorporated therein. Incorporation of aluminum foil into a foamable polystyrene composition by the practice of the present invention results in a distribution uniformity of about 99 percent in contrast to about 80 percent when the aluminum foil is incorporated by the practice of the prior art as determined by measurement of the dielectric constant of portions of blocks prepared by foaming particulate masses.

In a similar manner, other infusible materials such as metal foils, pigments, plate-like materials such as paper planchettes, mica, graphite and lead flakes are readily incorporated into extrudable polymeric materials such as polystyrene, polyvinyl chloride, cellulose esters such as ethyl cellulose, cellulose acetate and cellulose acetate butyrate, extrudable condensation polymers such as polyamides and the like.

As is apparent from the foregoing specification, the method and apparatus of the present invention is susceptible of being embodied with various alterations and modifications which may differ particularly from those that have been described in the preceding specification and description. For this reason it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method of incorporating infusible (material) into an extrudable expandable thermoplastic synthetic resinous composition comprising: preparing a heat plastified extrudable mass of the thermoplastic resinous composition, continuously forwarding and dividing said mass into at least two generally opposed portions, adding between said opposed portions an infusible additive material, converging said generally opposed portions to intimately contact said additive forming a laminate having the additive material positioned between layers of the resinous composition and subsequently dividing the resultant laminate into a expandable particulate mass.

2. The method of claim 1, wherein said generally opposed portions are formed into a facing pair of flat sheet-like streams.

3. The method of claim 2, wherein the additive material is provided in a generally sheet-like configuration.

4. The method of claim 2, wherein the infusible material is provided in a particulate form.

5. The method of claim 2, wherein the additive material is carried into the converging sheet-like streams by a pair of rotating surfaces having at least a portion of said surfaces in contact with said streams and said rotating surfaces rotating in a direction opposite to the direction of flow of said converging streams.

6. The method of claim 5, wherein the polymer immediately adjacent said rotating surfaces has a higher temperature than that of the converging streams.

7. The method of claim 2, wherein said converging streams are polystyrene and said additive material is aluminum foil.

8. The method of claim 7, wherein said additive material comprises a laminate of polystyrene sheets having disposed therebetween an aluminum foil.

9. The method of claim 2, wherein said particulate mass is subsequently heated to a temperature sufficiently high to cause expansion of said particles and knitting together thereof into a unitary cellular mass having a generally uniform distribution therethrough of said infusible material.

10. An apparatus for the preparation of a uniform dispersion of an infusible material in an extrudable thermoplastic material comprising in cooperative combination an extruder for the forwarding of extrudable thermoplastic material having a die, said die comprising a housing defining at least a pair of generally opposite passageways, said passageways adapted to receive an extrudable thermoplastic mass from said extruder, and form the extrudable material into a pair of opposed sheet-like configurations wherein the major surfaces of the sheet-like configurations are disposed in adjacent relationship, said housing defining an additive passageway disposed therebetween said converging opposite passageways and in full communication therewith.

11. The apparatus of claim 10, wherein said opposite passageways terminate in a pair of generally slot-like openings.

12. The apparatus of claim 11, wherein a pair of rotatable rolls are disposed within said die and define part of the wall of said opposite passageway.

13. The apparatus of claim 12, wherein said rolls have heating means associated therewith.

14. The apparatus of claim 13, including means positioned adjacent the die to cool the extruded composition.

References Cited by the Examiner

UNITED STATES PATENTS

| | | | |
|---|---|---|---|
| 2,133,441 | 10/1938 | Fischer | 156—501 |
| 2,249,507 | 7/1941 | Van Der Hoef | 18—15 |
| 2,419,035 | 4/1947 | Quinn et al. | 18—47.5 |
| 2,690,206 | 9/1954 | Mueller | 156—501 |
| 2,716,190 | 8/1955 | Baker | 260—418 |
| 2,857,625 | 10/1958 | Carlson | 264—321 |
| 2,877,501 | 3/1959 | Bradt | 264—143 |
| 2,897,543 | 8/1959 | Weston et al. | 18—13 |
| 2,992,456 | 7/1961 | Pearson et al. | 18—47.5 |
| 3,004,292 | 10/1961 | Folkins et al. | 264—141 |

FOREIGN PATENTS 127,825  4/1945  Australia.

EARL M. BERGERT, *Primary Examiner.*

ALEXANDER WYMAN, HAROLD ANSHER,
*Examiners.*

H. L. GATEWOOD, V. A. MALLARE,
*Assistant Examiners.*